United States Patent Office 3,819,788
Patented June 25, 1974

3,819,788
EXTRUDED PLASTIC FILMS AND METHOD FOR FORMING THE SAME
Pierre Grumbach, Sartrouville, France, assignor to La Cellophane, Paris, France
Filed Nov. 23, 1971, Ser. No. 201,289
Int. Cl. B29d 23/04, 23/18
U.S. Cl. 264—89    5 Claims

ABSTRACT OF THE DISCLOSURE

A process is disclosed for preparing plastic film having spaced transverse ribs thereon wherein the plastic is extruded in tubular shape, drawn into a hollow member by vacuum after extrusion while still hot or after reheating and moving the hollow member along with the tubular shape while fusing portions of the tubular film upon itself to give a circumferential rib then releasing the vacuum and moving the hollow member back in the opposite direction to position the member for a repeat of the operation.

BACKGROUND OF THE INVENTION

Field of the Invention

The present invention pertains to extruded plastic films and, more particularly, to such films having a tubular configuration and method and apparatus for forming the same.

Discussion of the Prior Art

Plastic films obtained by extrusion processes generally are weaker or present greater brittleness in the direction of extrusion as compared with a direction across or transverse to the direction of extrusion; and, accordingly, when such films are torn, the tear has a tendency to run parallel to the direction of extrusion. Thus, once such films are torn, the resulting lengthwise tear cannot practically be limited. The tendency to permit lengthwise runs in such films results from the orientation of the chains of molecules during extrusion. The weakness or brittleness of such extruded plastic films increases with the age of the film when exposed to external degradation agents such as heat and light and is particularly pronounced in films continuously exposed to weather conditions such as those films utilized in agriculture. These films are frequently of greater length in the direction of extrusion, and, thus, when a tear occurs, such tear will rapidly run to a great extent.

SUMMARY OF THE INVENTION

Accordingly, it is an object of the present invention to overcome the above described disadvantages of extruded plastic films by preventing indeterminate lengthwise tears.

The present invention is generally characterized in an extruded plastic film having a longitudinal direction of extrusion and being predominantly of a first thickness, the film having areas of thickness greater than the first thickness extended across the longitudinal direction of extrusion, methods for forming such extruded plastic films including extruding a tubular sheath of plastic material and either extruding a cord of the same plastic material and applying the cord to the tubular sheath, or applying a yarn coated with the same plastic material to the tubular sheath, or thickening the extruded tubular sheath by means of suction. The present invention is further generally characterized in apparatus for implementing the above described methods.

Another object of the present invention is to form an extruded plastic film having an area of increased thickness running crosswise to the direction of extrusion either transverse or oblique thereto.

A further object of the present invention is to provide a method of forming an extruded plastic film by adding thickness to areas extruded across the films as the film is being extruded thereby permitting the film to be formed in a continuous manner.

The present invention has another object in the provision of apparatus for providing areas of increased thickness across the longitudnal direction of extrusion of the film.

Some of the advantages of the present invention over the prior art are that extruded plastic films according to the present invention are mechanically less brittle in that they have a limited propensity to tear lengthwise, and when a tear appears, its length will not exceed the distance separating two areas of increased thickness in a lengthwise direction, the extruded plastic films of the present invention provide greater resistance to mechanical forces and, therefore, are not required to be combined with textile lattices for applications where they will be exposed to great mechanical forces, and the extruded plastic films of the present invention have a useful life equal to or greater than the useful life of prior art films having a considerably greater thickness.

Other objects and advantages of the present invention will become apparent from the following description of the preferred embodiments taken in conjunction with the accompanying drawings.

DESCRIPTION OF THE PREFERRED EMBODIMENTS

Figure 1:
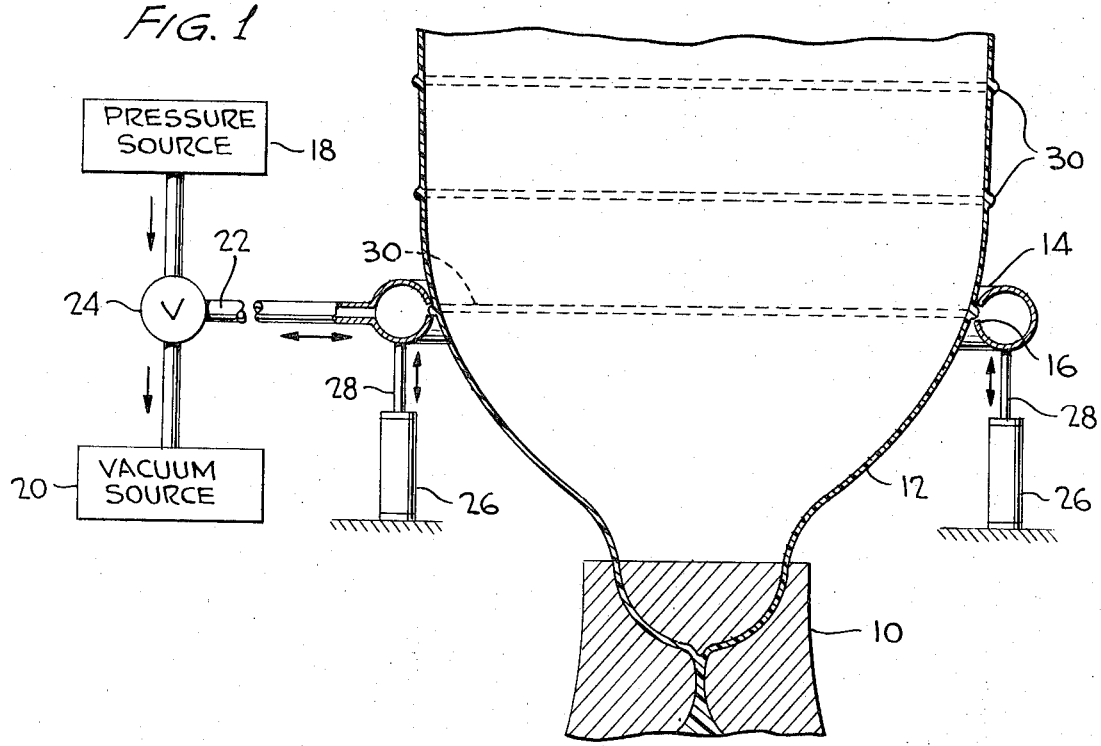
FIG. 1 is a schematic side elevation partially in section of apparatus for forming extruded plastic films according to the present invention.

Apparatus for forming an extruded plastic film in accordance with the present invention is illustrated in FIG. 1 and includes a stationary spinnerette 10 which extrudes a tubular sheath 12 in a conventional manner, the sheath having a zone forming a bubble while the material is still in a soft, plastic or pre-set state. As is conventional, the tubular sheath is formed by blowing fluid on the inside of the extruded sheath and taking up the extruded sheath between a pair of rollers after cooling and solidification such that the pressing together of the tubular sheath at the rollers enhances the inside pressure of the fluid and the speed of rotation of the rollers, which is greater than the extrusion speed, causes biaxial drawing at the desired rate of the extruded plastic film.

A hollow deforming ring 14 surrounds the tubular sheath 12 and is concentrically aligned therewith such that the plane of ring 14 is transverse to the longitudinal direction of extrusion of the tubular sheath. Ring 14 is disposed within the zone where the tubular sheath is still in the soft, plastic state and has an annular slit or opening 16 therein with a width corresponding to the desired width of the area of increased thickness to be formed on the tubular sheath. The hollow central portion of ring 14 selectively communicates with a pressure source 18 and a vacuum source 20 through a conduit 22 and a valve 24. The ring 14 is provided with a reciprocating movement at a speed equal to the speed of sheath 12 in the longitudinal direction of extrusion of the tubular sheath 12 by means of pneumatic cylinders 26 which control rods 28 engaging the ring such that the ring 14 is moved along with the tubular sheath 12 during deforming of portions of the tubular sheath as will be described hereinafter.

In operation, the valve 24 is controlled along with the cylinders 26 in accordance with the spacing desired between areas of increased thickness, and valve 24 is first operated such that the hollow central portion of ring 14 communicates with vacuum source 20. Accordingly, a portion of the tubular sheath 12, which is still in its plastic or pre-set state, is drawn or sucked into slit 16 and is deformed and fused upon itself to form an annular bead 30 defining an area of increased thickness extending transversely to the longitudinal direction of extrusion of the tubular sheath. The ring 14 is moved at the same speed as the tubular sheath 12 during this bead-forming operation by means of cylinders 26 and rods 28; and, once the bead has been formed and the ring 14 has reached the end of its reciprocating path of travel, the valve 24 is operated to provide communication between the pressure source 18 and the ring 14 such that fluid under pressure forces the bead 30 and tubular sheath 12 away from the ring to disengage the ring and permit its movement down to its original position to form the next bead. As the sheath 12 continues in the direction of extrusion, the beads 30 solidify to form, without additional external material, an area of increased thickness on the tubular sheath. Of course, the distance between consecutive beads 30 may be regulated by suitable control means as desired for controlling the amplitude of reciprocating movement of the ring; and, similarly, the thickness of the beads 30 may be controlled.

The embodiment of FIG. 1 may be modified by disposing ring 14 adjacent the outlet of spinnerette 10 or as a part thereof such that the areas of increased thickness are formed at the movement of formation of the tubular sheath 12. This modification will not disturb portions of the sheath already extruded, and the ring can be maintained stationary with suction being provided by vacuum acting during an extremely short time, such as a fraction of a second, followed by a blast of fluid under pressure for disengagement.

Figure 2:
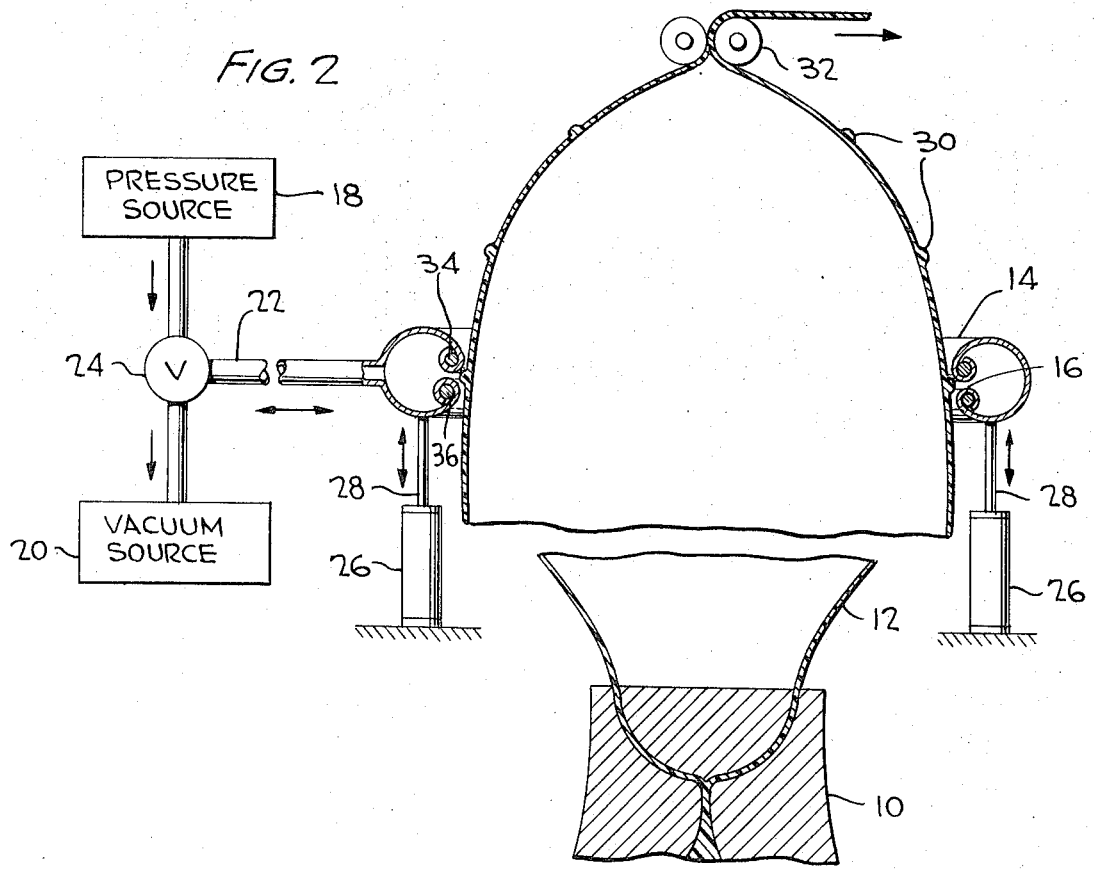
FIG. 2 is a schematic side elevation partially in section of a modification of the apparatus of FIG. 1.

The embodiment of FIG. 2 is similar to FIG. 1 with the exception that the beads or areas of increased thickness are formed in a zone where the tubular sheath is already solidified. Parts in the embodiment of FIG. 2 which are identical to parts in the embodiment of FIG. 1 are given identical reference numbers and are not described again.

The hollow ring 14 is disposed in the vicinity of a pair of pressing rollers 32 which are utilized to flatten the tubular sheath prior to delivery to a reel. A pair of heating resistor elements 34 and 36 are secured on either side of slit 16 by turning the edge of the hollow ring around the elements, and electricity is supplied to heat resistor elements 34 and 36 such that the plastic material of the tubular sheath 12 is fused when a portion of the tubular sheath is sucked into slit 16 to form beads 30.

The operation of the embodiment of FIG. 2 is the same as the above described with the respect to the embodiment of FIG. 1 with the exception of the use of heating elements 34 and 36 to fuse the plastic material.

Figure 3:
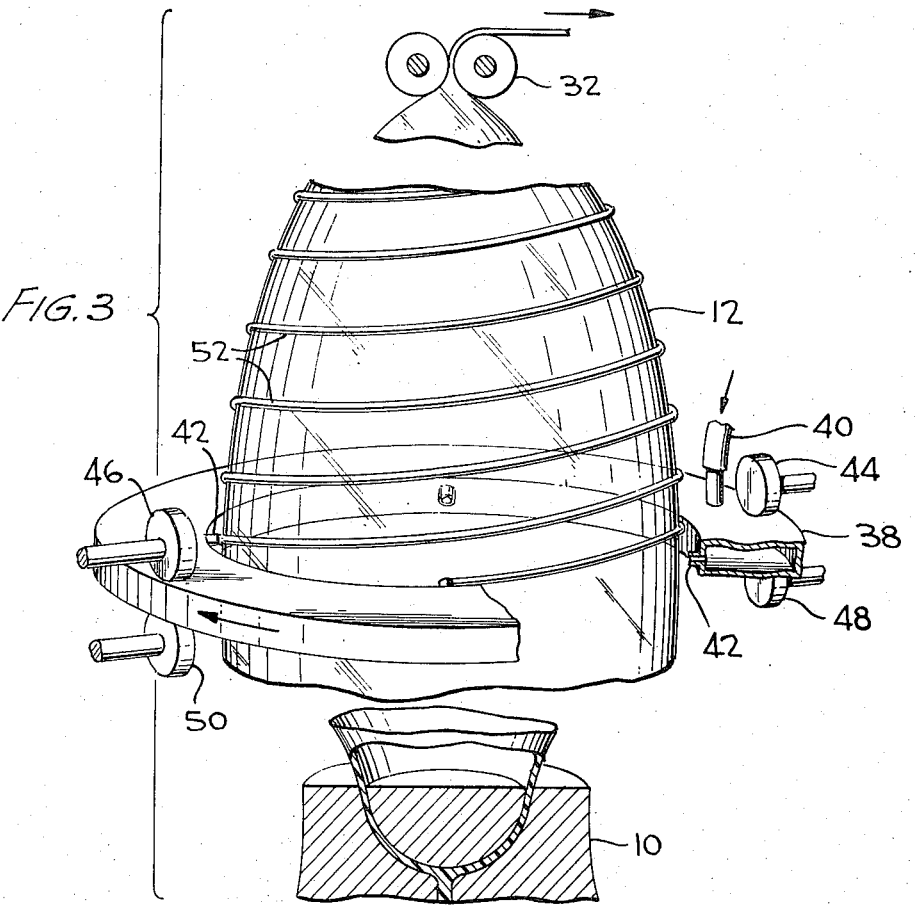
FIG. 3 is a perspective view of a further embodiment for forming extruded plastic films in accordance with the present invention.

Another embodiment of apparatus for forming an extruded plastic film according to the present invention is illustrated in FIG. 3 and, similar to the embodiment of FIG. 1, includes a spinnerette 10 for extruding a tubular sheath 12. A turning or rotating spinnerette 38 is arranged concentrically about spinnerette 10 and may be fed by the same extruding mechanism or by a separate extruding mechanism through a conduit 40. Spinnerette 38 has a plurality of bores or outlets 42 formed in the internal edge thereof and arranged in a crown in concentric relation with the spinnerette 10. The spinnerette 38 may be held in place and rotated by wheels 44 and 46 engaging the upper surface of the turning spinnerette and wheels 48 and 50 engaging the lower surface of the spinnerette and disposed below wheels 44 and 46, respectively. Any one or pair of the wheels 44, 46, 48 and 50 may be positively driven in either direction to provide rotation for the spinnerette with the remaining wheels being utilized for support purposes.

In operation, the spinnerette 38 is continuously rotated around the tubular sheath 12 such that a cord 52 is extruded from each bore 42 and is helicoidally wrapped around the tubular sheath and fused thereto since the cords are still in their soft, plastic state. The incline or angle of the cords 52 as they are applied to the sheath 12 is controlled by the speed of rotation of the turning spinnerette 38 such that the angle between the crosswise arrangement of the cords 52 and the longitudinal direction of extrusion of the tubular sheath 12 approaches 90° as the speed of the turning spinnerette is increased. Any number of bores 42 may be utilized with the turning spinnerette 38 in order to provide a desired number of and spacing between consecutive cords 52. Due to a continuous method of applying the cords 52 to the tubular sheath 12, it will be appreciated that the extruded plastic film is provided with areas of increased thickness where the cord has been applied thereto.

Figure 4:
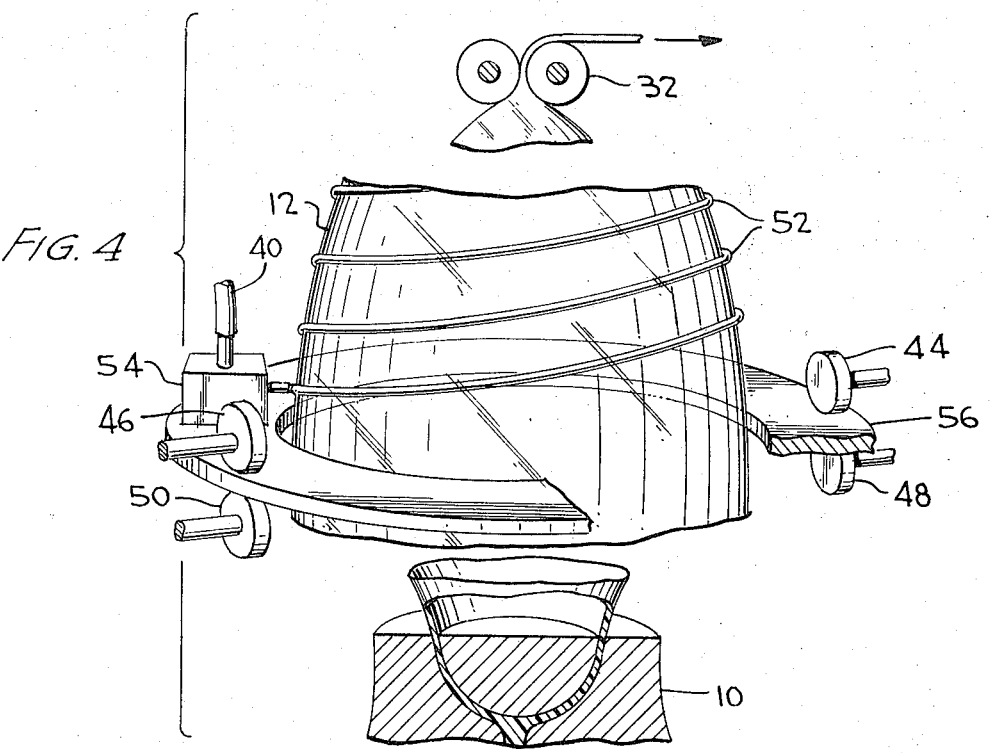
FIGS. 4 and 5 are broken perspective views of apparatus for informing an extruded plastic film in accordance with the present invention wherein areas of increased thickness are formed by the applying of a cord to a tubular sheath.

A modification of the embodiment of FIG. 3 is illustrated in FIG. 4 with identical parts having identical reference numbers and not described again. The primary difference between the embodiments of FIGS. 3 and 4 is that one or more extruding machines 54 are supported on a turning platform 56 which is held in a stationary plane and rotated by means of wheels 44, 46, 48 and 50 in the same manner as described with respect to the embodiment of FIG. 3. The extruding machines may be supported on platform 56 either horizontally or slightly inclined in the direction of extrusion of the tubular sheath.

The operation of the embodiment of FIG. 4 is the same as that of FIG. 3 in that material to be extruded is supplied through a conduit 40 to the extruding machines 54 which rotate around the moving tubular sheath 12 in order to supply one or more extruded cords tangentially thereto. The cords are applied to the sheath while in a soft, plastic state such that they fuse helicoidally thereon; and, as previously mentioned, the inclination and spacing of the cords may be controlled by regulating the speed of rotation of the platform 56 and the number of extruding machines utilized.

Figure 5:
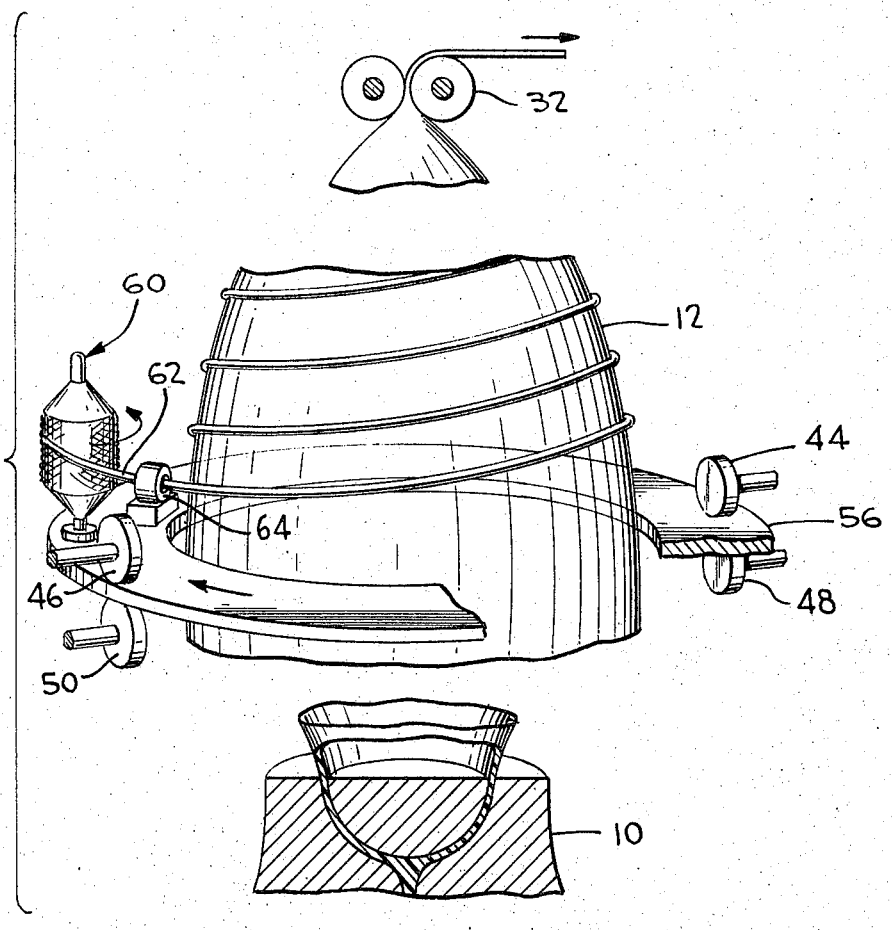

A further embodiment of apparatus for forming extruded plastic films according to the present invention is illustrated in FIG. 5 and differs primarily from the previous embodiments in that the cords applied to the tubular sheath 12 are supplied by one or more unwinding reels 60 which are mounted on a rotating platform 56 similar to that of FIG. 4 with each of the reels 60 carrying spools of textile yarn 62 coated with the same plastic material being extruded to form the tubular sheath 12. The yarns are passed through a heating ring 64 as they are delivered tangentially to the tubular sheath in order to heat the plastic coating to place it in a soft, plastic state immediately prior to application to the sheath in order to form a helicoidal wrapping in the same manner as previously described with respect to the embodiment of FIG. 4. The inclination and longitudinal spacing between the plastic coated yarns is dependent upon rotational speed of the platform and the number of yarns being supplied to the tubular sheath.

The methods to be implemented with the apparatus of FIGS. 1 and 2 basically include extruding a tubular sheath of plastic material and deforming portions of the tubular sheath by drawing the portions into the ring 14. The methods utilizing the apparatus of FIGS. 3 and 4 basically include extruding a tubular sheath of material and applying one or more extruded cords thereto in a helicoidal configuration. The method according to the apparatus of FIG. 5 is similar except that a textile yarn having a plastic coating is applied to the tubular sheath with the plastic coating in a soft, plastic state. When utilizing the methods and apparatus according to FIGS. 3, 4 and 5, it is advantageous to form the cords and plastic coatings of the same plastic material as the extruded plastic sheath such that the combination of cords and the tubular sheath is indissolubly fused.

The beads or cords constituting areas of increased thickness extending across the longitudinal direction of extrusion may be longitudinally spaced dependent upon the nature and predominant thickness of the extruded plastic film and the nature and type of work the films must perform. For example, for films 120 to 150 microns thick, such as films used in agriculture, excellent results are obtained when the areas of increased thickness are longitudinally spaced 10 to 12 cm. apart. Of course, the spacing should be determined by acceptable length of tears.

The areas of increased thickness may be oblique or perpendicular to the longitudinal direction of extrusion; however, the strength of the films increases as the inclination of the areas of increased thickness approaches 90°. If the areas of increased thickness are insufficiently inclined, a risk of running occurs when the film is subjected to great mechanical forces.

Any extrudable plastic may be utilized with the present invention, particularly polyolefins, polyethylene, polypropylene and the like obtained by low pressure processes and polyvinyl chloride. Films formed of the above materials may have areas of increased thickness produced in any manner such as by stamping extruded flat or tubular films; however, such processes generally require additional manipulation or working of the film which increases costs. Accordingly, the above described methods are preferred.

The embodiments of FIGS. 1 and 2 are advantageous in that areas of increased thickness are provided without requiring additional material or incurring the costs of turning spinnerettes, platforms, extending machines or unwinding reels. Furthermore, the embodiments of FIGS. 1 and 2 may be utilized with extruded sheaths having lengthwise or oblique areas of increased thickness in order to form latticed films as desired.

Inasmuch as the present invention is subject to many variations, modifications and changes in detail, it is intended that all matter described above or shown in the accompanying drawings be interpreted as illustrative and not in a limiting sense.

What is claimed is:

1. A method for forming plastic material into thin plastic films having spaced transverse ribs thereon, comprising the steps of:

(a) extruding the material into an advancing tubular sheath of thin film;
   (b) capturing a circumferential portion of the sheath while the film is in a plastic state in a movable hollow member by applying a vacuum to the hollow member to fuse the portion upon itself and thereby form a circumferential rib;
   (c) moving the hollow member with the tubular sheath as the sheath advances;
   (d) releasing the vacuum and moving the hollow ring in the opposite direction to position the hollow member to capture another circumferential portion of the sheath and form a subsequent circumferential rib spaced from the first rib; and
   (e) repeating steps (b) through (d) while step (a) continues to thereby form thin plastic film having spaced transverse ribs thereon.

2. The method of claim 1, wherein the hollow member is positively pressured as the hollow member moves in the opposite direction.

3. The method of claim 1, wherein the hollow member is a circular ring disposed coaxially of the sheath and wherein the ring has an opening formed therein around the internal diameter thereof.

4. The method of claim 1, wherein the vacuum is applied to the hollow member, while the plastic state of the film results from heat occurring during the extrusion step.

5. The method of claim 1, wherein the vacuum is applied after the film of the tubular sheath has cooled from the extrusion step and wherein heat is applied to the portion of the sheath captured in the movable hollow member to render that portion plastic so that the portion adheres to itself to form the rib.

References Cited
UNITED STATES PATENTS

| | | | |
|---|---|---|---|
| 3,280,847 | 10/1966 | Chisholm et al. | 264—167 |
| 3,399,262 | 8/1968 | Quackenbush et al. | 264—210 R |
| 3,264,383 | 8/1966 | Niessner et al. | 264—95 |
| 3,478,139 | 11/1969 | Martin et al. | 264—95 |
| 3,310,620 | 3/1967 | Martelli et al. | 264—99 |
| 3,538,209 | 11/1970 | Hegler | 264—99 |

JEFFERY R. THURLOW, Primary Examiner

U.S. Cl. X.R.

264—92, 95, 167, 209, 210 R

UNITED STATES PATENT OFFICE
CERTIFICATE OF CORRECTION

Patent No. 3,819,788    Dated June 25, 1974

Inventor(s) Pierre Grumbach

It is certified that error appears in the above-identified patent and that said Letters Patent are hereby corrected as shown below:

In the heading, insert:

-- Claims priority, application France, filed November 27, 1970, No. 70/42639 --

Signed and sealed this 5th day of November 1974.

(SEAL)
Attest:

McCOY M. GIBSON JR.
Attesting Officer

C. MARSHALL DANN
Commissioner of Patents